Jan. 19, 1960 G. G. HOBERG ET AL 2,922,135

ELECTRICAL PIN BOARD CROSS CONNECTING DEVICE

Filed March 4, 1955 3 Sheets-Sheet 1

INVENTORS
GEORGE G. HOBERG
WILLIAM W. DEIGHTON
MILTON A. ROSANDER
Raymond B. Parker
ATTORNEY

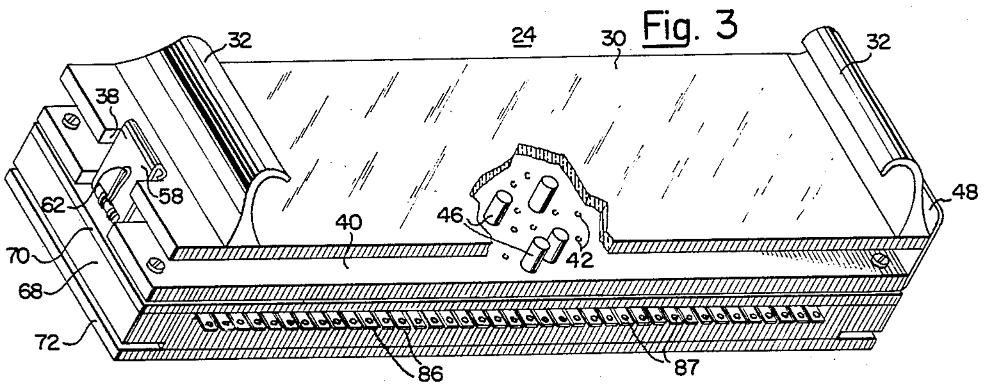
Fig. 3
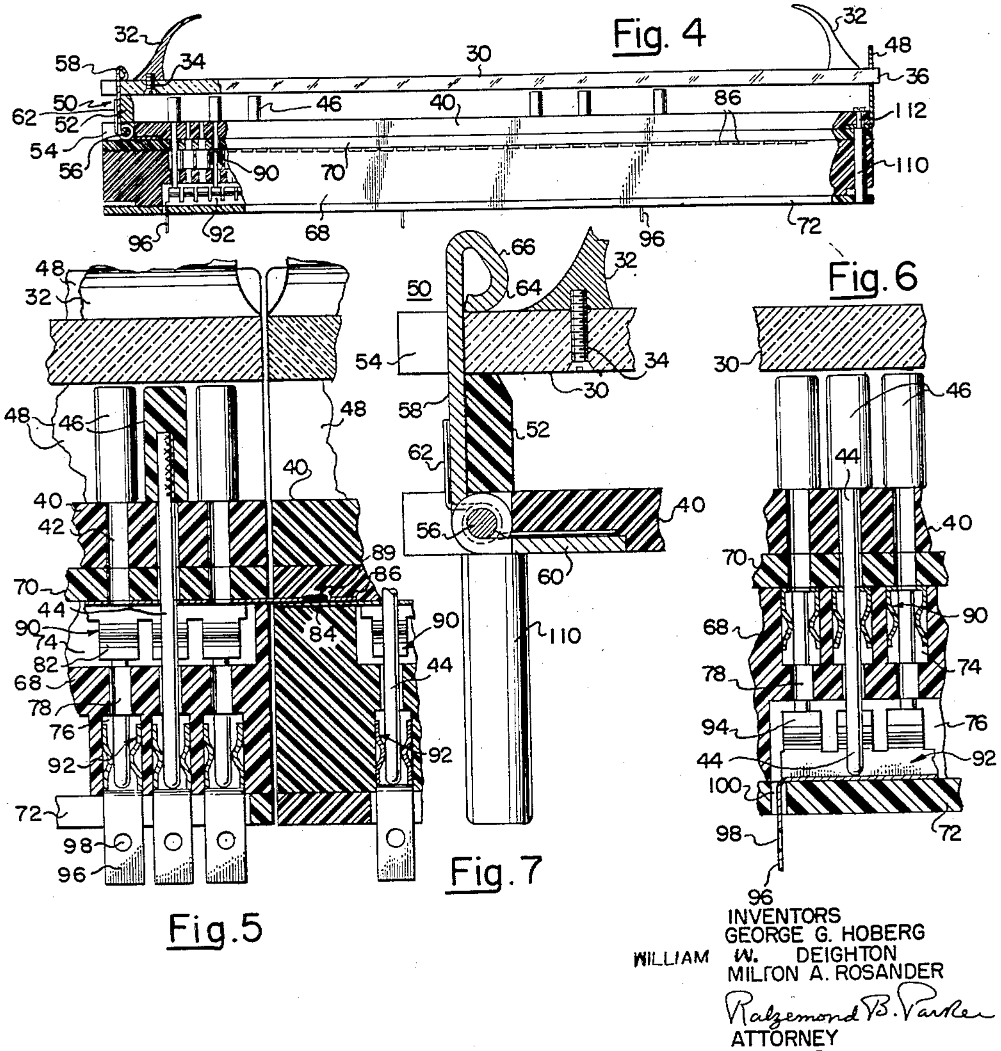
Fig. 4, Fig. 6, Fig. 7
Fig. 5
INVENTORS
GEORGE G. HOBERG
WILLIAM W. DEIGHTON
MILTON A. ROSANDER
Ralzemond B. Parker
ATTORNEY

ELECTRICAL PIN BOARD CROSS CONNECTING DEVICE

Filed March 4, 1955 3 Sheets-Sheet 3

INVENTORS
GEORGE G. HOBERG
WILLIAM W. DEIGHTON
MILTON A. ROSANDER

Ralzemond B. Parker
ATTORNEY

United States Patent Office 2,922,135

Patented Jan. 19, 1960

2,922,135

ELECTRICAL PIN BOARD CROSS CONNECTING DEVICE

George G. Hoberg, Berwyn, William Ward Deighton, Darby, and Milton A. Rosander, Berwyn, Pa., assignors to Burroughs Corporation, Detroit, Mich., a corporation of Michigan Application March 4, 1955, Serial No. 492,061

10 Claims. (Cl. 339—18)

This invention relates to programming apparatus and more particularly, although not necessarily exclusively, to a pin board type cross connecting device.

In those applications where it is desirable or necessary to switch information from one level of equipment to another or to interconnect multiple input devices to multiple output devices, a plurality of switches or patch cords have generally been utilized. Mechanical switches and electrical wiring or wired plugs are most usually incorporated in such apparatus and are so connected between the input and output apparatus that it is often difficult and time consuming for an operator to change or alter original programming due to the overlay of lines. Such changes must usually be performed in steps of insertion and removal of individual patch cords or by means of opening or closing switches. In the case of automatic switches, it has generally been necessary to employ expensive and complex electronic circuits including large numbers of vacuum tubes in order to accomplish the desired electrical changeover.

In most prior types of pinboard assemblies, more especially these pinboards utilizing "patch cords," the operator had considerable difficulty in ascertaining the exact program which has been set up once the maze of cross connecting wires or cords were in place. Added to this confusion was the impractical situation which arose when it was desired or necessary to change a portion only of the pre-arranged program cords. In this latter instance, the wired program usually had to be completely deplugged or torn down because the overlay of wires or lines was too tangled to afford quick and easy access to the one or more groups of lines or wires whose rearrangement was desired.

It is, therefore, an object of the present invention to overcome the disadvantages of the information switching mechanism heretofore used and to provide novel means for accomplishing the programming and switching operations with an efficient, interchangeable arrangement of parts designed for convenient accessibility to the operator.

It is another object of the present invention to provide an improved multi-path transfer device utilizing one or more readily detachable elements for switching potentials from one piece of apparatus to another piece of apparatus.

It is a further object of the invention to provide improved means whereby a pre-determined and pre-selected program may be caused to be set up on a plurality of cross connecting boards.

It is still a further object of the invention to provide an improved pinboard matrix cross connecting means having visual means for indicating the desired pre-selected program thereon.

A further object of the invention is to provide improved programming means for computers wherein removable plug-in type of switching elements are employed and which are at all times visible to the eye of the operator, yet are prevented from being accidentally lost or removed.

In accordance with a preferred form of the invention, there is provided a matrix cross connecting device in the form of a multi-element pinboard. The pinboard of the illustrated embodiment of the invention comprises a plurality of insulating members, several of which contain registering apertures or holes for receiving the connecting pins for effecting the cross over connections in the device.

Incorporated in the device are separate sets of conductive elements, the sets criss-crossing one another on different levels and shaped in a novel manner to releasably retain the connecting pins in selected positions in the registering holes. Each of the conductive elements in each set is shaped with a plurality of pairs of integrally connected opposed portions or fingers which are inwardly bowed and U-shaped for pin gripping action. The inwardly bowed portions of the two sets of conductive elements are disposed in the assembly of insulating members so that the opposed portions of one element of one set cooperate with a pair of opposed portions of another element of the other set to enclose an inserted pin, the inwardly bowed portions of the opposing portions functioning to yieldingly grip the pin and releasably hold it against removal.

Each conductive pin is provided with an insulated handle which is oversize the shank of the pin. In assembled position in the device the pins are locked against withdrawal by a removable overlying transparent cover which renders the location of the pins clearly visible to the operator at all times. With the cover removed the pins are adaptable for insertion and removal into the registering holes of the assembled members of the device and when fully inserted they electrically and mechanically connect separate rows and columns of conductive elements. In this manner, information which is to be fed from an input source to the various terminals of the conductive strip elements, is able to be readily switched from one level of operation to other levels of operation.

The invention will be best understood from a reference to the specification and claims and to the attached series of drawings in which:

Fig. 3 is an isometric view of the assembled cross connecting unit of the present invention, partially broken away, and illustrating the transparent cover and the handles of several conductive pins used therewith;

Fig. 4 is a view in side elevation, partially broken away in section, of the unit of Fig. 3;

Fig. 5 is an enlarged fragmentary cross sectional view through the assembled unit of Figs. 3 and 4;

Fig. 6 is an enlarged fragmentary longitudinal sectional view through the assembled unit;

Fig. 7 is an enlarged view partly in section of the releasable cover latch;

Figures 1, 2:
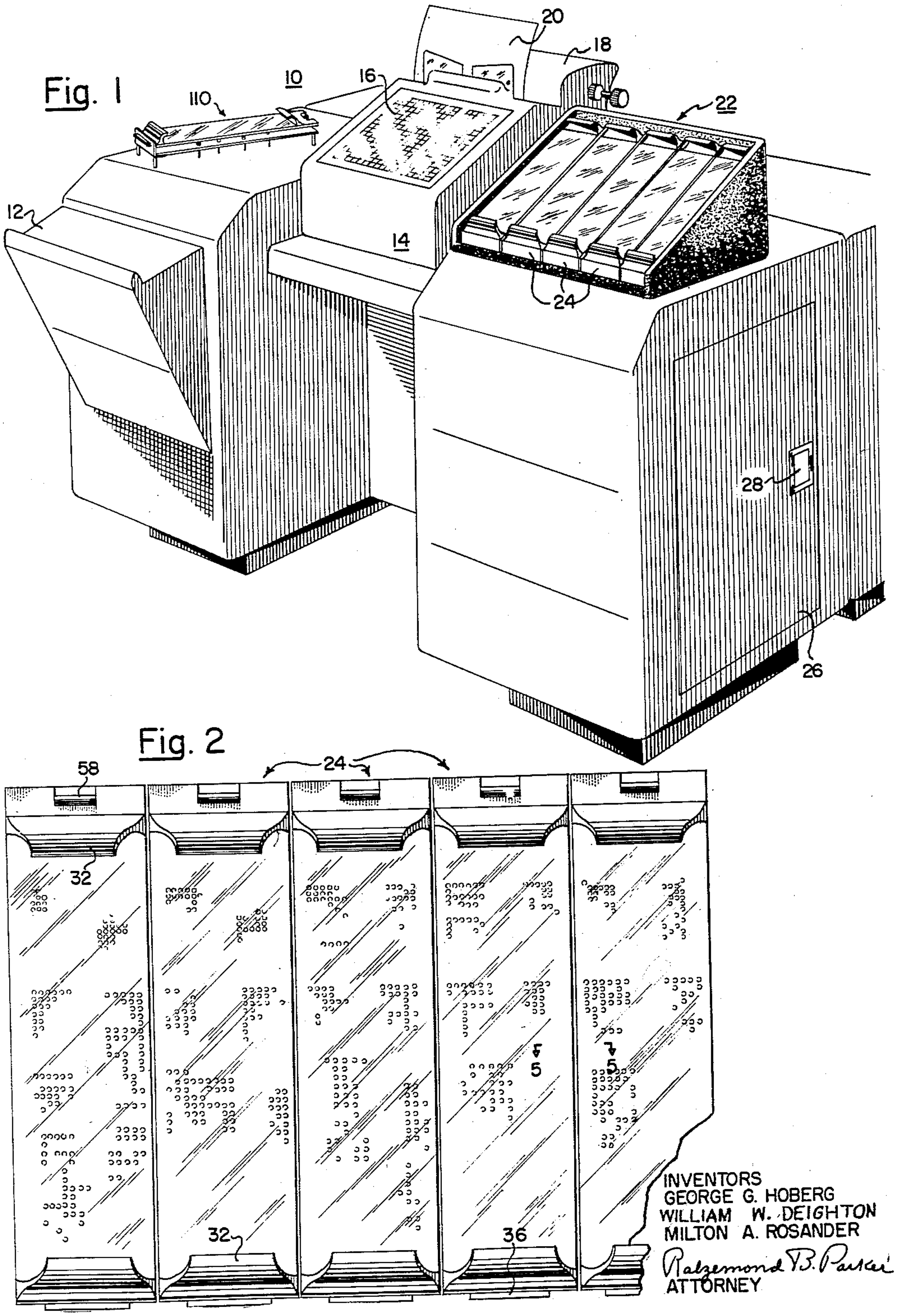
Fig. 1 is a perspective view of a representative embodiment of the invention as incorporated in a computing machine.
Fig. 2 is a top plan view of a plurality of cross connecting units adapted to be received in the computing machine.

Referring now to Fig. 1 of the drawings, a computing machine is illustrated with which the novel device of the present invention shown is associated. The computing machine comprises, in general, a supporting structure, which as illustrated may take the form of a desk 10. The desk is adapted to house a power supply, certain storage devices, amplifying apparatus, and transfer elements and circuitry for transferring selected information within the computing system. The desk contains an exposed control panel 12 and an information input-output device 14. The input-output device 14 may be in the form of a unitary assembly having manual selecting elements such as a keyboard 16 and a movable carriage 18 for supporting and shifting a printable medium 20 upon which printing characters in the input-output device are adapted to strike.

The programming device of the present invention forms a component part of computing machine 10 and is generally indicated at 22 thereon. In order to provide a visible, easily accessible, simply rearrangeable, programming device, it is desirable to mount the device on the top of the desk along side of the input-output device 14 and provide it with a slanting or sloping face as shown. The device is preferably fabricated as a multiple unit assembly, the separate units of which are similar to one another and are identified by the general reference character 24. The series of units employed in the illustrated embodiment of the invention is shown in plane in Fig. 2. They are detachably secured to the slanting face of the programming device. The slope of the program units 24 with respect to the top portion of the desk affords the operator of the machine a clear view of the units and makes their movable parts readily accessible for adjustment and for removal and replacement. Below the programming device, the side of the desk is provided with a door 26 having a latch 28 which provides access to the interior of the desk for inspection and adjustment of various concealed parts including the connections of the programming device to other operating elements of the machine. It is thus apparent that the programming device is arranged in a highly convenient and readily accessible location on the top portion of the desk and alongside of the information input-output component 14 of the computer. The slope of the face of the programming device may correspond to the keyboard of the input-output device as shown to improve the accessibility for adjustment and visual check.

The program device 22 assumes a multi-unit form, as before mentioned, for ease in fabrication, accessibility and operation. As illustrated in Fig. 2, there are five units 24 in the illustrated embodiment of the invention. Each unit 24 constitutes an independent structure and incorporates electrical cross connecting means which is otherwise referred to herein as a pinboard. The pinboards are adapted to be pluggably secured upon the upper face of the component 22 and are maintained in proper electrical connection and mechanical disposition thereon.

Referring now more particularly to Figs. 3, 4, 5, 6 and 7, each improved pinboard 24 of the present invention is illustratively set forth as exhibiting a substantially rectangular formation composed of several separable layers or members. In the embodiments of the invention illustrated herein each pinboard assembly is made up of five superimposing members. These members are detachably joined together as hereinafter described into an insulating structure of convenient portability and adjustment and with certain electrical contacts projecting therefrom for connection with electrically operated components in the computer.

The topmost member of each unit 24 is a transparent cover 30 having incurved handles 32—32 at the opposite ends to facilitate assembly and removal of the whole unit into and from the program device 22 of the computer. Each handle may be secured to the upper face of the cover member by screws 34. The cover member may be composed of glass or light permeable plastic material to render the control elements thereunder visible to the eye. One end of the cover member is reduced to form a slightly projecting tongue 36 while the opposite end is provided with a centered recess or notch 38, the functions of these structural features being described hereinafter.

Disposed below the cover 30 and visible therethrough, if a template hereinafter described is not employed, is a matrix member 40 of electrically insulative material. This member is provided substantially throughout its entire area with perforations or holes arranged in parallel rows and crossing parallel columns. The holes are identified at 42 and extend completely through the member from one side to the other and are preferably circular in formation. As previously mentioned, plug-in elements are guided by the holes of the matrix member for connecting electrical conductors in the unit normally insulated from one another. Suitable plug-in elements as illustrated herein are in the form of pins each having an elongated shank 44 of electrically conductive material capped by an enlarged handle 46 of insulating material. The margins of the matrix member opposite to the rows and columns may be marked to identify any given hole by its coordinate position in order to aid the operator in locating the proper positions to insert the pins. As hereinafter described, the use of a template is a more convenient, faster and accurate way of setting up the programming of the computer.

The matrix member 40 serves another function and that is to detachably support the cover member 30 in spaced relation thereto as shown in Figs. 3 and 4. For this purpose, the matrix member is provided at one end with an upstanding plate or bracket 48 and at the other end with a snap fastener assembly generally indicated at 50. The bracket 48 is preferably L-shaped with the leg thereof fixed to the underside of the matrix member. The upright portion of the bracket is provided with a horizontal slot elevated above the upper surface of the matrix member and of size to snugly accommodate the tongue-like projection 36 of the cover member as shown in Figs. 2 and 4.

The illustrated form of snap fastener assembly 50 includes a transverse block 52 rising to the height of the lower edge of the slot in the bracket 48 and serving as a rest for the underside of the notched end of the cover member 30. The matrix member is also provided with a recess or notch 54 generally corresponding in size and shape to the notch of the cover member. Supported in the notch 54 is a transversely extending pintle 56. Two hinge plates 58 and 60 have knuckles curled on the pintle as in the usual conventional hinge design. One hinge plate 58 is free to swing to the upright position shown whereas the other hinge plate 60 is fixed in a recess in the underside of the matrix member. A spring wire member 62 has several turns encircling the pintle and one end section bearing against the unmovable hinge plate 60 and the other end section bearing against the outer face of the movable hinge plate 58. The spring pressure is such as to swing the hinge plate 58 to the vertical position shown in Figs. 3, 4 and 7 where it abuts the side of the rest 52. The upper extremity of the hinge plate 58 is inturned to form a loop 64 spaced from the rest 52 approximately the thickness of the cover member and provided with an inclined portion 66 upon which the inside edges of the notch 38 of the cover member may ride as it is snapped into position. It is evident that by first interengaging the tongue 36 of the cover member into the bracket 48 and then releasably locking the other end with the snap fastener assembly 50 that the cover member will be joined to the matrix member and yet supported thereby in spaced relation to its upper surface. It is also evident from the drawings that the space between the cover and matrix members is barely sufficient to accommodate the handles 46 of the plug-in pins.

An important member of each unit 24 is the frame member 68. This member is relatively thick as compared with the balance of members in the unit and like the matrix member 40 it is composed of electrically insulative material. The frame member contains a multiplicity of electrical contact elements loosely mounted therein, and to hold them in place the frame member is sandwiched between two relatively thin panels 70 and 72 of insulating material. The upper panel 70 is provided with rows and columns of holes registerable with those of the matrix member.

The top and bottom surfaces of the frame member 68 are formed with grooves for the reception of electrically conductive elements. The grooves on the upper side are identified at 74; and the grooves on the bottom side at 76. The grooves on each side extend parallel to one another but the grooves of the two sides extend at right angles to one another. Thus, the grooves 74 on the upper surface extend in rows transversely to the longitudinal dimension of the frame member whereas the grooves 76 on the bottom surface extend in columns parallel to this dimension. Each set of grooves preferably extends for a depth of approximately a third of the thickness of the frame member, leaving an ungrooved middle section as is evident in the enlarged sectional view of Figs. 5 and 6. Extending through the middle section of the frame member and connecting the bottoms of the upper grooves 74 with the lower grooves 76 are a plurality of holes 78. These holes are arranged to register with the holes of the matrix member when the members of the unit are in assembled condition.

Figure 10:
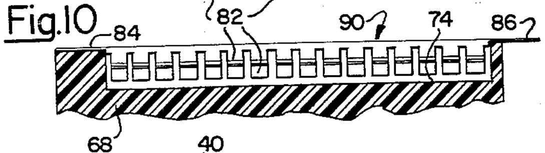
Fig. 10 is a side elevation, after bending, of conductive element of Fig. 6.
Figure 11:
Fig. 11 is end view of the device of Fig. 10.

The transverse grooves 74 in the upper surface of the frame member terminate short of the longitudinal sides thereof and preferably closer to one side than the other as best shown in Fig. 10. The longitudinal grooves 76 in the bottom surface of the frame member may extend any suitable distance thereon. In the illustrated embodiment of the invention, the longitudinal grooves 76 are subdivided into three groups spaced longitudinally apart on the bottom of the frame member, the lengths of the grooves in the respective groups being approximately equal to one another and the lengths of the transverse grooves on the upper surface of the frame member. This is not an essential arrangement, but in the present application of the invention it enables the use of the same basic type of electrical conductor strips for both the upper grooves 74 and the lower grooves 76.

Carried in the grooves of the upper and lower sets of grooves in the frame member are electrical conducting strips. These strips are arranged in a novel manner to engage diametrically opposite portions of the shanks of the plug-in pins. To this end each conducting strip is generally channel shaped in formation including a base portion of the channel and opposed side portions extending perpendicularly away therefrom and shaped to yieldingly press against the shank of the plug-in pin and tightly embrace the same.

Figure 9:
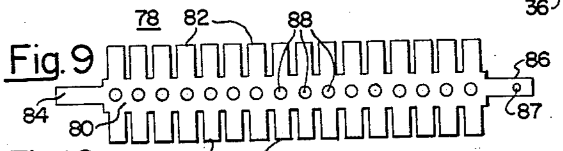
Fig. 9 is a top plan view of one of the conductive strip elements in flat unbent condition.

Referring particularly to Figs. 9, 10, 11 and 12, the fabrication and eventual seating of the conductor strips for the upper surface of the frame member 68 is shown. In Fig. 9 a flat blank 78 for the formation of a conductor strip is shown. The blank includes a longitudinal center section 80 which becomes the base of the channel, opposed laterally extending fingers or prongs 82 which are the contacts for engaging the plug-in pin, and extensions 84 and 86, and a series of holes 88 in the center portion 80 which are disposed in alignment with each opposed pair of fingers and are of a size to receive the shank of the plug-in pin. The blank 78 is thereafter bent into a channel formation such as shown in the end view of Fig. 11 with the end extensions 84 and 86 continuing to project in the same plane as the base portion 80. The channel strip thus formed is generally identified in Fig. 10 by the reference character 90. Each such strip is placed in one of the upper recesses or grooves 74 of the frame member in the manner shown in Fig. 10 with the extensions 84 and 86 bearing on the marginal portions of the frame member at the opposite ends of the groove and thus suspending the strip above the base of the groove 74 as evident in Fig. 10. The disposition of the grooves 74 closer to one side than the other side of the frame member enables one end extension, such as 86, to project from the side of the frame member and also the unit as is evident in Figs. 3 and 10. This extension may be provided with a hole 87 to facilitate electrical connection to circuitry in the computer.

The conductor strips of the lower set which are received in the grooves 76 opening out through the bottom surface of the frame member 68 are similarly formed as the conductor strips 90 with certain exceptions. In order to distinguish the two sets of conductor strips from one another, the strips of the lower set are generally identified by the reference character 92. In one embodiment of the invention as indicated in full line in Fig. 12, the conductor strips 92 may be mounted in the unit with their channel formations opening upwardly and with their bases resting on the lower panel 72. In this arrangement the holes 88 may be omitted from the conductor strips since the shanks of the pins will not have to pass through their bases. In another arrangement, however, the conductor strips 92 may be inverted and have their channel formations open downwardly as shown in dotted outline in Fig. 12. In this instance the holes 88 are provided in the bases of the conductor strips.

The upwardly projecting opposed paired finger portions of the conductor strip 92 are identified at 94—94. These finger portions correspond to the fingers 82—82 of the upper set of conductor strips. In order to make connection with contacts mounted in the upper face of the programming device 22, one end extension 96 of each conductor strip 92, which corresponds to either end extension 84 or 86 of each conductor strip 90, is bent perpendicularly to the base of its channel formation for projection through slots in the bottom panel 72 as more particularly described hereinafter. The end extensions of the lower conductor strips 92 may each be provided with a hole, as shown at 98, to facilitate connection to a contact element in the base of the programming device 22.

Figure 8:
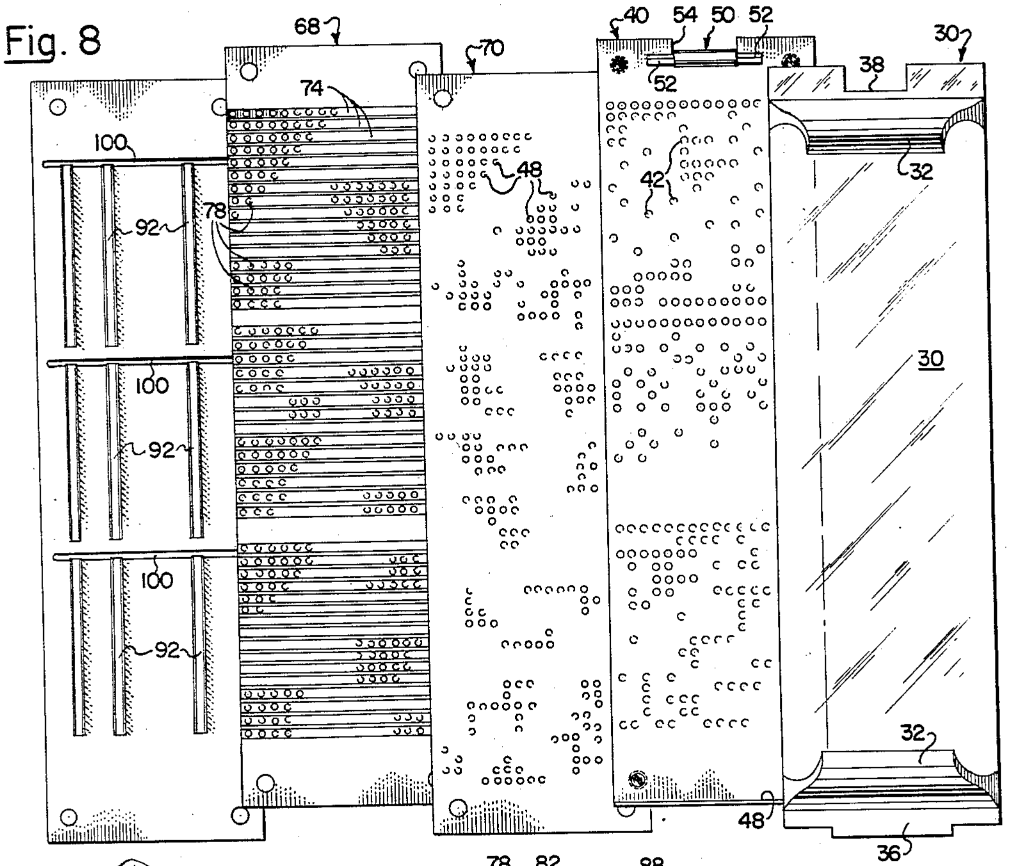
Fig. 8 is an exploded top plan view illustrating various members of one of the cross connecting units of the present invention in the order of their assembly.
Figure 12:
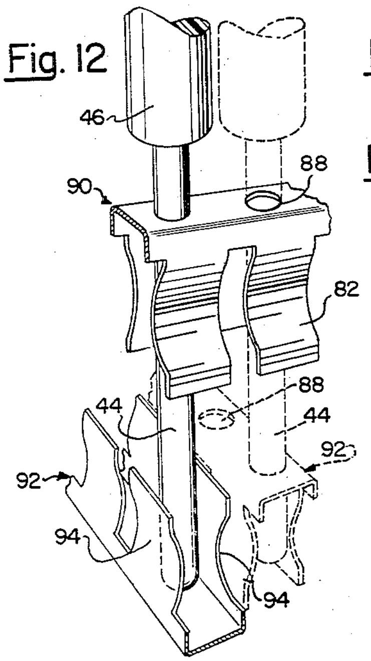
Fig. 12 is an enlarged isometric fragmentary view showing the internal operating disposition of a cross connection pin with two conductive strip elements.

It was earlier mentioned that the bottom panel member 72 is provided with slots through which the bent end extensions 96 of the lower conductor strips project. With reference to the lower panel 72, this member is provided at longitudinally spaced intervals with several transverse slots identified at 100 as best shown in Fig. 8. These slots extend completely through the lower panel 72 as is evident in Fig. 4. The depending extensions 96 of the lower conductor strips project through these slots, as is evident in Figs. 4, 5, and 6, and beyond the bottom side of the unit. If the bottom conductor strips are inverted as shown in dotted outline in Fig. 12, then the end extension corresponding to that identified at 96 is bent in the opposite direction and may be made longer to reach and project through the adjacent slot 100.

In their assembled relation in each unit 24, the upper conductor strips 90 and the lower conductor strips 92 extend perpendicular or crosswise to one another. A shank of a plug-in pin inserted through the crossing point of these two conductor strips will first pass through a hole 86 of the upper strip 90 and thence between the opposed fingers 82—82 thereof. Depending upon whether the lower conductor strips have their channels open upwardly or downwardly, the shank of the plug-in pin will enter the channel or first pass through a hole 88 and then enter the channel and thereafter pass between a pair of opposing fingers 94—94. As clearly shown in Fig. 12, the fingers of each conductor strip are inwardly bowed and yieldingly compressed against the sides of the shank of the plug-in pin. The fingers of the upper conductor strip yieldingly press against diametrically opposite portions of the shank and likewise the fingers of the lower conductor strip yieldingly press against similar portions of the shank but at positions 90° to those of the fingers of the upper strip. The result is that the opposed pairs of contacts of each conductor strip bear against circularly spaced portions of the shank of the plug-in pin. It is evident that each pin functions to electrically connect a pair of crossing conductor strips 90 and 92 and the latter through their respective end extensions 86 and 96 are joined into the computer circuits to serve a particular purpose.

Figure 13:
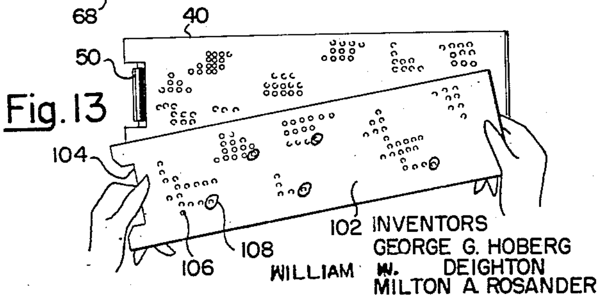
Fig. 13 is a plan view of one of the units with the cover removed showing manner of assembling a program template.

Optionally associated with each unit 24 is a pin guide or template shown at 102 in Fig. 13. This member is preferably formed of paper or other light weight material and is dimensionally shaped to fit the unit in which it is assembled including a notch 104 corresponding in position to notches 38 and 54 of the cover and matrix members respectively. The member 102 serves as a template for guiding the operator in the insertion of the plug-in pins and is provided with perforations 106 arranged in rows and columns similar to the holes in the members of the unit and is further provided with suitable markings for identifying certain of the holes into which the pins are to be inserted such as by the encircling rings 108 shown in Fig. 13. An alternative marking arrangement would be to provide holes in the template 102 for only those positions in which the pins are to be inserted leaving the balance of the template blank or at least imperforate. The template 102 is readily replaceable and it is a highly desirable, although not a necessary element in the unit, for the reason that it serves as a convenient, accurate guide for the insertion of the pins by the operator of the computing machine. In use, as shown in Fig. 13, the template is overlaid upon the matrix 40 and is thus readily visible through the transparent cover 30.

Each multiple unit assembly is provided with means for aligning the separate components thereof into proper superimposed registered position. In the illustrated embodiment of the invention such means comprises four corner posts identified at 110 as shown in Fig. 7 and also at the right of Fig. 4. Each post is hollow and internally threaded and has a length equal to the combined thicknesses of the frame member 68 and the upper and lower panels 70 and 72. Received within each post is a screw member identified at 112 which is passed through holes provided in the matrix member 40 and is threaded in the post with which it is associated. The head of the screw member 112 overlies the upper surface of matrix member 40 and when threaded as far as possible in the post it draws the latter tightly up against the under side of the matrix member where it forms a projecting part thereof. The cover posts are slidably retractably received in the holes in the frame and panel members provided therefor.

It is thus apparent that the matrix member 40 and the cover member 30 form a subsidiary unitary assembly, as indicated in Fig. 7, which is capable of being lifted upwardly away from the frame member 68 and its associated top and bottom panel members 70 and 72. This is a distinct advantage in the installation and operation of the programming device as is pointed out hereinafter. Each frame member 68 and its associated top and bottom panel members are first installed in the programming device 22 of the computer. When installed, the downwardly projecting end extensions 96 of the bottom conductor strips 92 of each unit 24 enter slots provided in the upper surface of the programming device for interconnection with computer circuitry in the desk 10. The external projecting end extensions or tabs 86 of the transverse conducting strips 90 of each unit are overlappingly interconnected with the opposite non-projecting ends of the transverse strips of the next adjacent unit as shown in Fig. 5. The overlapping end extensions 84 and 86 may be soldered as indicated at 89 to form a relatively firm electrical connection. From one end unit 24 the tabs 86 projecting from the side thereof do not interconnect with the transverse conductor strips of an adjacent unit but instead enter a side wall of the programming device for contact with computer circuit elements provided therein especially for this purpose.

The lower subsidiary assembly of each unit composed of the frame member 68 and the top and bottom panel members 70 and 72 forms a relatively permanent installation in the programming device 22 covering the upper surface thereof, yet capable of removal for inspection and replacement of parts if desired. However, the upper subsidiary assembly composed of the matrix member 40 and the cover member 30 is readily insertable and removable from the programming device by simply sliding the corner posts 110 and the pins 44 into and out of the registering holes of the frame and panel members. In use, a larger number of removable matrix and cover sub-assemblies may be used than there are base frame and panel sub-assemblies in the programming device. The pins 44 may be already placed in the proper positions in these removable assemblies for various programming arrangements. By having these removable subassemblies programmed in advance it improves the speed and flexibility of the control of the machine. By simply grasping the handles 32—32 it is possible to quickly insert and remove these sub-assemblies from the base sub-assemblies and substitute one for the other. One of these sub-assemblies is shown at 110 in Fig. 1 readily available for interchange with similar sub-assemblies already in use in the programming device 22. Other such sub-assemblies may be at hand for replacement of those in use on the machine.

There has been provided as a result of this invention an improved cross connecting device particularly adaptable for computing machines and designed so that the parts are easily removable and installable. As described hereinabove, the device is composed of a plurality of separate units each provided with projecting contact elements for connection to one another and to the circuit of the computer in which they are installed. Moreover, each unit is provided with control plug-in elements or pins which are always visible to the operator, are readily removable from and insertable into the unit, and in the fully assembled condition of the unit are prevented from accidental dislodgement therefrom. Each unit is further composed of a plurality of members shaped for easy and economical manufacture and assembly. Enclosed within each unit are a plurality of crossing electrical conductor strips insulated from one another and yet arranged so that upon the insertion of a plug-in pin those strips contacted by the pin are securely electrically connected together.

In carrying out the objects of the invention, each conductor strip is designed for economical manufacture from a flat blank and in final form exhibits the desired channel configuration as hereinabove described for compact assembly in the unit and in order to provide the resilient pressure for engaging the plug-in pins. The construction of the separate members of each unit is such that the conducting strips do not have to be secured therein but merely are dropped into place in recesses especially provided therefor. The result is that there is a minimum of fastening operations for securing the parts of the unit together so that it can be quickly assembled and if need be easily disassembled and parts replaced. The addition of the template enables the operator to quickly program the computer. The construction of each unit and their combined assembly into a computer program device provides a neat appearing, easily operated adjunct to a computer machine and avoids the mess and confusion produced by the normal patch cords commonly used in the past. The removability and interchangeability of the sub-units 110 with the pins conveniently set for different programming operations eliminates pinboard programming while installed in the computer and provides a distinct saving both in time and labor.

What we claim is:

1. A programming device for computers comprising an electrically insulating member having at least two opposite substantially parallel surfaces, each of said surfaces being provided with parallel rows of grooves, the grooves of one surface lying crosswise of the grooves of the other surface and the bases of the grooves of one surface opening into the bases of the grooves of the opposite surface at the points of intersection thereof, an elongated electrically conducting strip of channel shape cross sectional formation disposed in each of said grooves and extending substantially the length thereof, the side walls of the channel-shaped formation of each strip being provided with opposed pairs of resiliently deflectable projections forming separate extensions of the side walls thereof, removable electrically conductive cross connecting pins positioned perpendicular to the planes of the grooved surfaces of the insulating member and extending through the points of intersection of certain of the strips of one of said grooved surfaces with certain of the strips of the said opposite other grooved surface, the opposing pairs of the projections of the strips yieldingly gripping such cross connecting pins for electrical connection thereto.

2. An electrical cross connecting board including, in combination, a rectangularly shaped electrically insulating body provided with parallel flat top and bottom surfaces and having a matrix of holes arranged in rows and columns, said top and bottom surfaces being provided with rows of parallel grooves, the grooves of the top surface being crosswise of the grooves of the bottom surface, a series of elongated electrical conducting strips loosely mounted in the grooves of the top surface of said insulating body in alignment with the rows of holes and in insulated relation one with respect to the other, a second series of electrical conducting strips substantially identical to said first series of conducting strips loosely mounted in the grooves of the bottom surface of said insulating body in alignment with the columns of holes and in insulated relation one to the other and crossing at right angles to the first series of strips, each of said strips being provided with longitudinally spaced apart multiple pairs of oppositely disposed finger portions, each finger portion being bowed to provide a gripping surface, the opposing pairs of finger portions of each strip of one series aligning with an opposing pair of finger portions of the crossing strips of the other series and cooperating to yieldingly grip a pluggable pin-like element inserted into a selected matrix hole of the body.

3. An electrical cross connecting board comprising, in combination, a rectangularly shaped electrically insulating body having parallel flat top and bottom surfaces, said top and said bottom surfaces being provided with rows of parallel grooves, the grooves of one surface lying crosswise of the grooves of the other surface, a series of electrical conducting strips loosely mounted in the grooves of the top surface of said insulating body in parallel insulated relation one with respect to the other, a second series of electrical conducting strips substantially identical to said first series of conducting strips loosely mounted in the grooves of the bottom surface of said insulating body in parallel insulated relation one to the other and crossing at right angles to the first series of strips, each of said strips being provided with multiple pairs of oppositely disposed finger portions, each finger portion being bowed to provide a gripping surface, the opposing pairs of finger portions of each strip of one series aligning with an opposing pair of finger portions of the crossing strips of the other series and cooperating to yieldingly grip a pluggable pin-like element extending between crossing strips of the two series, a retainer panel for each of the top and bottom surfaces of said insulating body and being flush thereagainst to retain the strips therein against dislodgment, a member having a matrix of perforations providing guiding means for pluggable pin-like elements, means for securing the retainer panels to the top and bottom surfaces of the insulating body to retain the strips against dislodgment and for securing the matrix member against the outer surface of the retainer panel lying against the top surface of the body with the perforations of the matrix member registering with the cross over points of intersection of the strips in one series with the strips of the other series, a transparent cover member, and means carried by the matrix member for detachably securing the cover member in spaced apart relation to the exposed surface of the matrix member.

4. An electrical cross connecting pin board assembly including, in combination, a transparent cover member having one end reduced to form a projecting tongue and the other end indented to form a notch, a matrix member having a flat upper surface and having a multiplicity of holes therein arranged in rows and columns and opening out through said surface, said holes being adapted to receive retractable headed pins with the heads thereof oversize the holes and extending above said flat surface, a bracket element secured to the matrix member and projecting upwardly therefrom and provided with a horizontal slot spaced from said surface a distance slightly greater than the vertical dimension of the heads of the pins and shaped to receive the tongue of the cover member, a releasable fastener carried by the matrix member at the opposite end thereof and arranged to inter-engage with the notch of the cover member and releasably support the same at the same height as the tongue end of the cover member, the cover member being thus supported at a height above the upper surface of the matrix member sufficient to clear the heads of the pins received in the holes and thereby retaining the pins against accidental dislodgment while in the matrix member and at the same time rendering the position of the same visible through the transparent cover.

5. An electrical cross connecting pin board assembly including, in combination, a matrix member having a flat upper surface and being provided with a multiplicity of holes therein arranged in rows and columns and opening out through the upper surface thereof, said holes being adapted to receive pins having heads oversize the holes and with the heads of the pins projecting above said flat surface of the matrix member, a bracket element projecting upwardly from one end of the matrix member and provided with a horizontal slot, a releasable catch mechanism extending upwardly from the opposite end of the member, the holes of the matrix member being adapted to receive the shanks of retractable headed pins and mount the pins so that the heads thereof project above the upper flat surface of the matrix member, a cover member for the pinboard assembly having a projecting tongue at one end removably received in the slot of the bracket and having the opposite end releasably engaged by the catch mechanism, the slot of the bracket and the catch mechanism cooperating together to support the cover member at a position elevated above the flat surface of the matrix member sufficient to clear the heads of the pins received in the holes of the matrix member, said cover member being composed at least in part of transparent material rendering the heads of the pins visible through the cover member.

6. An electrical cross connecting pin board assembly comprising, in combination, an electrically insulating body having two opposite substantially parallel surfaces each one of which is provided with rows of parallel grooves, said body further having a matrix of holes therein opening into the grooves of the opposite surfaces of the body and arranged in perpendicularly related rows and columns, a series of metallic substantially channel-shaped elements removably received in the grooves of one of said surfaces in alignment with the columns of holes of the body and maintained out of contact with one another, a second series of metallic substantially channel-shaped elements removably received in the grooves of the opposite one of said surfaces in alignment with the rows of holes of the body and maintained out of contact with one another and out of contact with the first series of elements, each of said channel shaped elements including a plurality of projections extending away from at least one side wall thereof and each forming a separate extension of the element, an insulating body lying flush against each of said surfaces of the insulating body to retain the channel elements therein against accidental dislodgment therefrom, one of said insulating panels having a multiplicity of holes arranged in columns and rows corresponding to the holes of the insulating body, and means detachably securing the insulating body and the insulating panels together in a fixed assembled relation to one another with the rows and columns of holes of the insulating body registering with the holes of the panel containing the same, said panels acting to prevent accidental dislodgment of the elements from the grooves of their respective surfaces of the body, and elongated plug-in means insertable at will within any of the registering holes for engaging the projections in order to electrically connect any one of the first series of channel elements with any one of the second series of channel elements at the points of intersection thereof.

7. An electrical cross connecting pinboard assembly including, in combination, an electrical insulating member having two opposite substantially flat parallel surfaces and further having a series of parallel grooves disposed in each of said surfaces with the grooves of one surface lying crosswise of the grooves of the other surface, the grooves of one surface being connected to the grooves of the other series by apertures at the points of intersection of the grooves of the two series, an elongated electrically conductive strip lying in each of said grooves, each conductive strip being substantially channel-shaped in cross section and extending substantially the length of the groove within which it lies, the side walls of each strip having a plurality of opposing pairs of projections forming separate extensions thereof, the conductive strips in at least one of said series of grooves having holes through the bases of their respective channel formations aligning with said groove connecting apertures, and one or more removable plug-in pin elements of electrically conductive material received in certain of said apertures and extending through said holes of the conductive strips and engaging opposing pairs of the projections of the strips which are intersected thereby to electrically connect the same together.

8. An electrical cross connecting board including, in combination, a rectangularly shaped electrically insulating body provided with parallel flat, top and bottom surfaces having rows of parallel grooves, the grooves of the top surface being crosswise of the grooves of the bottom surface, said body further having a matrix of holes opening into the grooves of the two surfaces at their cross over points of intersection, a series of elongated electrical conducting strips received in the grooves of the top surface of said insulating body in insulated relation one with respect to the other and each in alignment with an individual one of the rows of matrix holes, a second series of electrical conducting strips substantially identical to said first series of conducting strips received in the grooves of the bottom surface of said insulating body in insulated relation one to the other and crossing at right angles to the first series of strips and each in alignment with an individual one of the columns of matrix holes, certain of said strips including an integral conductive portion extending parallel to the long dimension of the strip and projecting outwardly away from a side edge of said body and serving as an electrical terminal connection, each of said strips being provided with longitudinal spaced apart multiple pairs of oppositely disposed finger portions, each finger portion being bowed to provide a gripping surface, the opposing pairs of finger portions of each strip of one series aligning with an opposing pair of finger portions of the crossing strips of the other series and cooperating to yieldingly grip a pluggable pin-like element inserted into a selected matrix hole of the body.

9. An electrical cross connecting board comprising, in combination, a rectangularly shaped electrically insulating body having parallel flat top and bottom surfaces, each of said surfaces having a plurality of parallel spaced apart grooves, the grooves of one surface extending transversely of the long dimension of said insulating body and opening out at least on one of the longitudinal sides thereof, the grooves of the opposite surface extending parallel to the long dimension of said body, said body having holes extending therethrough and opening into the bases of the grooves at the points of intersection of the grooves on one of the surfaces with those on the other surface, a series of electrical conducting strips received in the grooves of the top surface of said insulating body in parallel insulated relation one with respect to the other, a second series of electrical conducting strips substantially identical to said first series of conducting strips received in the grooves of the bottom surface of said insulating body in parallel insulated relation one to the other and crossing at right angles to the first series of strips, each of said strips being provided with multiple pairs of oppositely disposed finger portions, each finger portion being bowed to provide a gripping surface, the opposing pairs of finger portions of each strip of one series aligning with one of the holes in the body and with an opposing pair of finger portions of the crossing strips of the other series and cooperating to yieldingly grip a pluggable pin-like element extending between crossing strips of the two series, certain of the strips of the series received in the grooves extending transversely of the long dimension of the body having integrally conductive tabs extending outwardly beyond said longitudinal side of the body.

10. An electrical pin board cross connecting device for computers and the like comprising, a first group of elongated electrical strip contacts disposed in side by side relation to one another, a second strip of elongated electrical strip contacts disposed in side by side relation to one another and extending crosswise of said first group of strip contacts, and insulating material interposed between said first and second groups of strip contacts and extending between the adjacent contacts of each of said groups thereby forming a first plurality of recesses extending substantially parallel to each other and a second plurality of recesses extending substantially parallel to each other and crosswise of the first plurality of recesses, said insulating material having a matrix of holes arranged in rows and columns and opening into the first and second plurality of recesses at their cross over points of intersection, one of said strip contacts being disposed in each recess of said first and said second plurality of recesses, each of the strip contacts being provided with longitudinally spaced apart pairs of upstanding oppositely disposed resilient finger portions being adapted to grip and make electrical contact with removable cross connecting members extending through the matrix holes between the two groups of strip contacts at certain of the points where the strip contacts of one group cross over the strip contacts of the other group.

References Cited in the file of this patent

UNITED STATES PATENTS 1,615,168 Doppke ---------------- Jan. 18, 1927

(Other references on following page)

UNITED STATES PATENTS

| | | |
|---|---|---|
| 2,427,908 | Hill et al. | Sept. 23, 1947 |
| 2,462,756 | Leopold | Feb. 22, 1949 |
| 2,483,551 | Libman | Oct. 4, 1949 |
| 2,549,725 | Uline et al. | Apr. 17, 1951 |
| 2,613,287 | Geiger | Oct. 7, 1952 |
| 2,669,702 | Klosterman | Feb. 16, 1954 |

FOREIGN PATENTS

| | | |
|---|---|---|
| 482,563 | Germany | Sept. 18, 1929 |
| 593,296 | Great Britain | Oct. 14, 1947 |
| 814,757 | Germany | Sept. 24, 1951 |